(12) United States Patent
Rao et al.

(10) Patent No.: US 7,242,676 B2
(45) Date of Patent: Jul. 10, 2007

(54) WIRELESS LAN AUTHENTICATION, AUTHORIZATION, AND ACCOUNTING SYSTEM AND METHOD UTILIZING A TELECOMMUNICATIONS NETWORK

(76) Inventors: Herman Rao, 7Fl., No. 12, Lane 87, Tianmu N. Rd., Shilin Chiu, Taipei (TW); Ching-Hsiang Hsu, 3F, No. 1, Alley 21, Lane 284, Wu Xiang Street, Taipei (TW); Jung Nan Hung, No. 236-7, Da-Ying Village, Hsin-Shih Country, Tainan (TW)

( * ) Notice: Subject to any disclaimer, the term of this patent is extended or adjusted under 35 U.S.C. 154(b) by 1170 days.

(21) Appl. No.: 10/274,938

(22) Filed: Oct. 17, 2002

(65) Prior Publication Data
US 2004/0076128 A1 Apr. 22, 2004

(51) Int. Cl.
*H04Q 7/24* (2006.01)
(52) U.S. Cl. .................... 370/338; 370/252; 709/229
(58) Field of Classification Search .............. 370/338, 370/329, 386, 469, 252; 380/247; 709/229; 455/406; 705/40
See application file for complete search history.

(56) References Cited
U.S. PATENT DOCUMENTS

2002/0012433 A1 * 1/2002 Haverinen et al. .......... 380/247
2003/0051041 A1 * 3/2003 Kalavade et al. ........... 709/229
2003/0157926 A1 * 8/2003 Ala-Laurila et al. ........ 455/406

* cited by examiner

Primary Examiner—John Pezzlo

(57) ABSTRACT

The invention provides an authentication, authorization and accounting (AAA) a system and method for a plurality of wireless local area networks (WLANs) operated by a plurality of WLAN operators comprising a mobile communications device connecting to a terminal comprising an Internet access application program for accessing the Internet, a personal identification number (PIN) application program, and a unique identifier application program. An Internet access session is requested from the mobile device by activating the Internet access application program in the terminal. Entry of a PIN is requested by activating the PIN application program in the terminal, wherein the PIN is authenticated. If the PIN is authenticated, a unique identifier is retrieved from the mobile device by activating the unique identifier application program in the terminal wherein the unique identifier is accepted by all of the plurality of WLANs operated by the WLAN operators, wherein the unique identifier is sent to an authentication server for WLAN authentication. If the authentication server authenticates the unique identifier, the authentication server instructs an access server that the unique identifier has been authenticated wherein the access server instructs an accounting server to begin access fee calculation. If the access server determines that the Internet access session has ended, the access fee calculation is ended at the accounting server and a total fee is calculated from the ended access fee calculation.

60 Claims, 7 Drawing Sheets

WIRELESS LAN AUTHENTICATION, AUTHORIZATION, AND ACCOUNTING SYSTEM AND METHOD UTILIZING A TELECOMMUNICATIONS NETWORK

FIELD OF THE INVENTION

This invention relates generally to wireless local area network (WLAN) systems and more specifically to a WLAN authentication, authorization, and accounting system utilizing a telecommunications network.

BACKGROUND OF THE INVENTION

Wireless local area networks (WLANs) are a rapidly growing communications medium for both enterprises (such as corporate intranets and hotels) and public facilities (for example, airports and convention centers). As an indication of the expected explosive growth of WLANs, it has been estimated that revenue for WLAN equipment will reach $3.2 Billion by the year 2005 (IDC Bulletin Unwiring the Network: Worldwide Wireless LAN Market Forecast Update, 2000–2005).

Around the globe, there are several main mobile telephone systems in operation, among them, Time-Division Multiple Access (TDMA), Code-Division Multiple Access (CDMA) and its variants such as Time Division Synchronization Code Division Multiple Access (TDS-CDMA) and Wideband Code Division Multiple Access (W-CDMA). The International Telecommunication Union of the United Nations recognizes, CDMA 2000, and TDS-CDMA as standard specifications for 3G (Third Generation) wireless communications while W-CDMA and CDMA 2000 are championed by Europe and the United States, respectively. Global System for Mobile Communications (GSM) is the very popular second generation digital mobile phone system established by the European Telecommunications Standards Institute and currently in widespread use in Europe and Asia. A GSM system typically includes Mobile Stations (MS) which are typically mobile phones and other terminals, a plurality of Base Station Subsystems (BSS) each having a plurality of Base Transceiver Stations (BTS) and a Base Station Controller (BSC), and a Network and Switch Subsystem (NSS) composed of a plurality of Mobile Switching Centers (MSC), Home Location Registers (HLR), Visitor Location Registers (VLR) and Authentication Centers (AuC). The Mobile Switching Centers switch communications connections and are communicable with a Public Switched Telephone Network (PSTN) and with at least one Base Station Controller (BSC). The BSC controls the handover of radio connections and the Base Transceiver Station (BTS) includes antennae towers for transmitting and receiving wireless signals and each delineating a cell each of which has a specific coverage area related to the physical location and the antenna direction of the Base Station Subsystems (BSS). The Home Location Registers (HLR) contain a database comprising subscriber information, such as user profiles, current location, International Mobile Subscriber Identity (IMSI) numbers and other administrative information. The Visitor Location Registers (VLR) comprise a database containing location information of all the MS. The Authentication Center (AuC) is coupled to the HLR and provides the latter with authentication parameters and ciphering keys utilizable for security purposes.

The mobile phone typically is functionally separated into the Mobile Equipment (ME) part and a Subscriber Identity Module (SIM) card which typically includes a subscriber-selected Personal Identity Number (PIN), dialing numbers, names of preferred networks to provide service, and the like. Some of the SIM information can be modified by using the keypad of the mobile phone or through a connected personal computer. The ME typically includes non-subscriber-related hardware and software specific to the communications interface. When the SIM is removed from the ME, the ME can no longer be used for reaching the service provider except for emergency calls.

Wireless mobile Internet access is widespread in Japan and Scandinavia and demand is steadily increasing elsewhere. It has been predicted that over one billion mobile phones with Internet access capability will be sold in the year 2005. Efficient mobile Internet access, however, will require new technologies. Data transmission rate improvements such as the General Packet Radio Service (GPRS), Enhanced Data Rates for GSM Evolution (EDGE), and the Third Generation Universal Mobile Telecommunications System (3G-UMTS) are underway.

Conventional systems utilize a PCMCIA card plus a wireless LAN card to provide a connection between a mobile phone and a WLAN. However, such a system requires a user to purchase all three of the components which will amount to several hundred dollars, thereby exacerbating the obstacles to widespread WLAN use.

While the promise of wireless LAN is immense, its more widespread use has encountered the sometimes conflicting problems of ease of use and security. As anyone who has traveled with a notebook can attest, connecting to any LAN, not even a wireless LAN, is a problem requiring assistance from an MIS professional. This is because of a lack of connectivity standardization. On the other hand, if the connection is standardized and easy, there is a problem of security; that is, if anyone can log on, then confidential or sensitive information available through the LAN will be accessible by anyone, thereby compromising the LAN. Concomitant with the standardization and security issues is the business issue of payment; that is, how is a LAN user to be charged for his use? This issue is succinctly summarized in industry jargon as "AAA", Authentication, Authorization, and Accounting. That is, the problems of ease of use and security are addressed by authenticating the user, authorizing him, timing and billing him.

Finally, there is the critical problem of cost. WLAN will take off after the above AAA issues are successfully addressed and the direct and indirect costs of WLAN decreases to a level allowing mainstream utilization.

There is therefore a need for a WLAN system and method that allows cost-effective ease of use while maintaining security and providing an effective and efficient billing and monitoring procedure.

SUMMARY OF THE INVENTION

The invention provides an authentication, authorization and accounting (AAA) a system and method for a plurality of wireless local area networks (WLANs) operated by a plurality of WLAN operators comprising a mobile communications device connecting to a terminal comprising an Internet access application program for accessing the Internet, a personal identification number (PIN) application program, and a unique identifier application program. An Internet access session is requested from the mobile device by activating the Internet access application program in the terminal. Entry of a PIN is requested by activating the PIN application program in the terminal, wherein the PIN is authenticated. If the PIN is authenticated, a unique identifier is retrieved from the mobile device by activating the unique identifier application program in the terminal wherein the unique identifier is accepted by all of the plurality of WLANs operated by the WLAN operators, wherein the unique identifier is sent to an authentication server for WLAN authentication. If the authentication server authenticates the unique identifier, the authentication server instructs an access server that the unique identifier has been authenticated wherein the access server instructs an accounting server to begin access fee calculation. If the access server determines that the Internet access session has ended, the access fee calculation is ended at the accounting server and a total fee is calculated from the ended access fee calculation.

A further embodiment of the invention provides an authentication, authorization and accounting (AAA) method for a plurality of wireless local area networks (WLANs) operated by a plurality of WLAN operators. According to this particular embodiment of the method of the invention, a mobile communications device is connected to a terminal having an Internet access application program for accessing the Internet, a personal identification number (PIN) application program, and a subscriber identity module (SIM) application program. An Internet access session is requested from the mobile device by activating the Internet access application program in the terminal. Entry of a PIN is requested by activating the PIN application program in the terminal. The PIN then undergoes authentication. If the PIN is authenticated, an international mobile subscriber identity (IMSI) number is retrieved from the mobile device by activating the SIM application program in the terminal wherein the IMSI number is accepted by all of the plurality of WLANs operated by the WLAN operators. The IMSI number is sent to an authentication server for WLAN authentication. The IMSI number then undergoes authentication at the authentication server. If the IMSI number is authenticated at the authentication server, an access server is instructed that the IMSI number is authenticated. An Internet access session is then provided to the mobile device. From the access server, an accounting server is instructed to begin access fee calculation. The access fee calculation is then performed at the accounting server. If it is determined that the Internet access session has ended at the access server, the access fee calculation is ended at the accounting server and a total fee from the access fee calculation is determined.

The invention provides another embodiment of an authentication, authorization and accounting (AAA) method for a plurality of wireless local area networks (WLANs) operated by a plurality of WLAN operators comprising the steps of connecting a mobile communications device to a terminal having an Internet access application program for accessing the Internet, a personal identification number (PIN) application program, and a unique identifier application program, requesting an Internet access session from the mobile device by activating the Internet access application program in the terminal, requesting entry of a PIN by activating the PIN application program in the terminal, authenticating the PIN. If the PIN is authenticated, the method according to this particular embodiment of the invention further comprises the steps of retrieving a unique identifier from the mobile device by activating the unique identifier application program in the terminal wherein the unique identifier is accepted by all of the plurality of WLANs operated by the WLAN operators, sending the unique identifier to an authentication server for WLAN authentication, authenticating the unique identifier at the authentication server. If the unique identifier is authenticated, the method according to this particular embodiment further comprises the steps of instructing an access server that the unique identifier is authenticated, instructing an accounting server from the access server to begin access fee calculation, performing the access fee calculation at the accounting server, determining if the Internet access session has ended at the access server. If it is determined that the Internet access session has ended at the access server, the access fee calculation is ended at the accounting server and a total fee from the access fee calculation is determined.

The process steps according to the authentication, authorization and accounting (AAA) method and system of the invention are advantageously transparent to the WLAN operators and implemented regardless of the types of WLAN operations. This cross-platform AAA functionality is particularly advantageous for WLAN environments where multiple WLAN formats and operators coexist.

BRIEF DESCRIPTION OF THE DRAWINGS

The preferred and other embodiments according to the invention are further described in detail below in conjunction with the accompanying drawings (not necessarily drawn to scale), in which.

DETAILED DESCRIPTION OF THE PREFERRED EMBODIMENTS

The preferred embodiment of the present invention utilizes mobile phones inventively coupled to computer and/or communications devices (such as notebook computers and personal digital assistants) which are communicable with a wireless local area network (WLAN) and a telecommunications network such as GSM to provide authentication, authorization, and accounting functions for the WLAN. Further, the authorized WLAN user can also roam other WLANs utilizing this invention.

Figure 1:
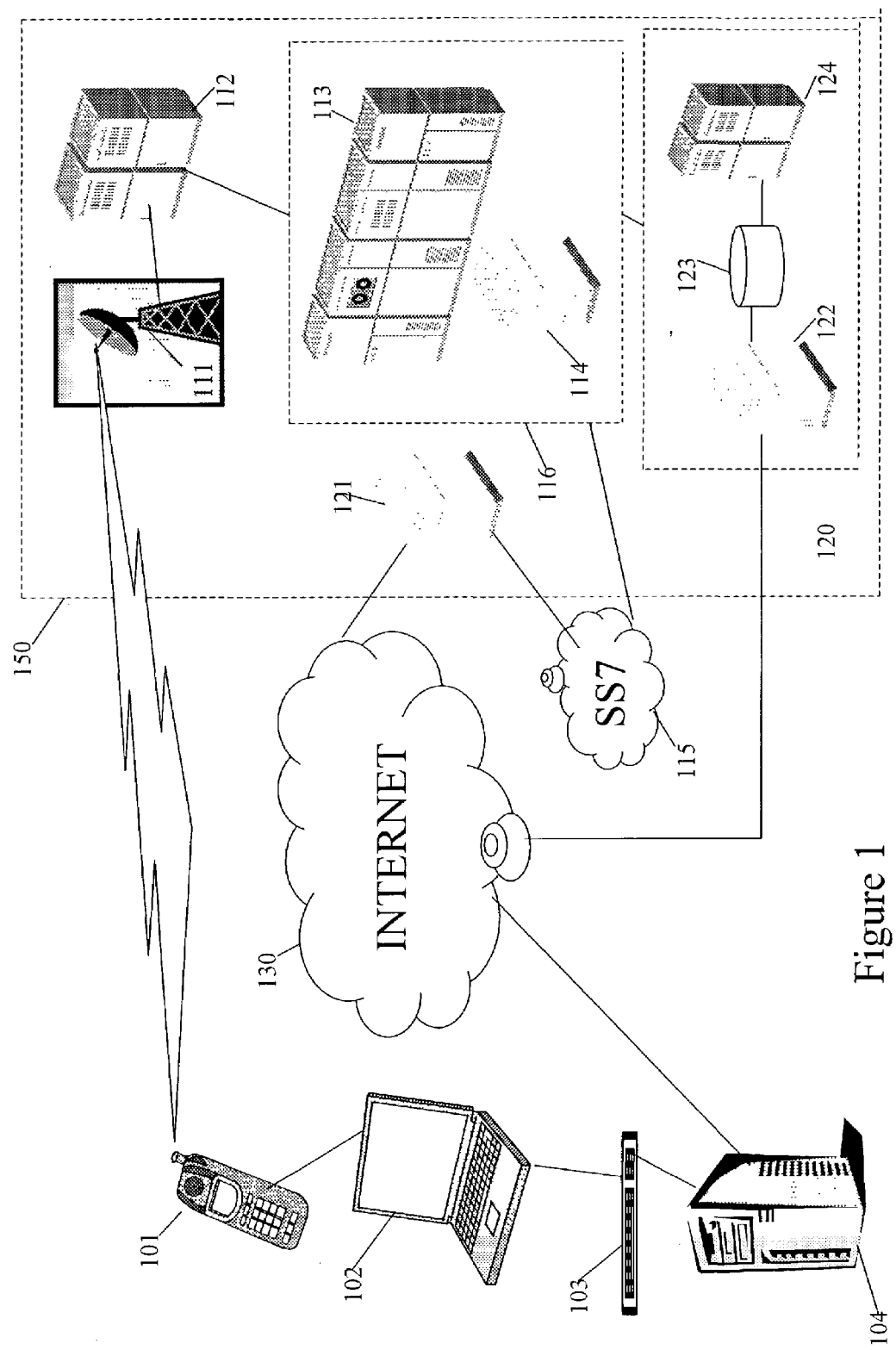
FIG. 1 is a block diagram schematically illustrating an authentication, authorization and accounting (AAA) system for a plurality of wireless local area networks operated by a plurality of WLAN operators in accordance with the invention.

In a preferred embodiment of the present invention, the IMSI of a SIM card in a mobile phone is utilized in conjunction with a password to activate the authentication, authorization, and accounting (AAA) functions. FIG. 1 is a schematic illustration of the AAA system utilizing a telecommunications network system according to the present invention, and wherein the connecting lines denote two-way transmission. Mobile phone 101 is communicable with a computer 102, and either mobile phone 101 and/or computer 102 may also be a notebook computer, personal digital assistant (PDA), palmtop computer, or other communications device that can access a telecommunications network system 150. Computer 102 in turn is communicable with an access point 103 which is communicable with an access server 104. Access server 104 is communicable with the Internet 130. Mobile phone 101 in the preferred embodiment is communicable with a Base Transceiver Station (BTS) 111. BTS 111 is coupled to Base Station Controller (BSC) 112 which is coupled to Home Location Registers (HLR)/Authentication Center (AuC) servers 113 and EXCESS INFORMATION REGISTER (EIR) server 114 in HLR/AuC/EIR system 116 which is communicable with signaling system 7 (SS7) network 115. An authentication server 121 communicates with network 115 and is communicable with the Internet 130. Also communicable with the Internet 130 is an accounting server 122 which is coupled to an accounting database 123 which is coupled to a billing system server 124, all of which form an accounts system 120.

In operation, a user utilizing mobile phone 101 communicates digitally with computer 102 through either a wireless communications system, such as Bluetooth™, or hard-wired using a cable. Computer 102 accesses the Internet 130 through access point 103 and access server 104 executing standard programs. At this point, mobile phone 101 user will enter the user name and password. Computer 102 then reads the user's International Mobile Subscriber Identity (ISMI) in mobile phone 101's Subscriber Identity Module (SIM) card. The system according to this particular embodiment of the invention uses the wireless application protocol (WAP), a standard protocol for providing Internet communications and telephony services to mobile devices (such as wireless handsets and pagers) and other wireless terminals (e.g., PDAs, notebook PCs).

Figure 2:
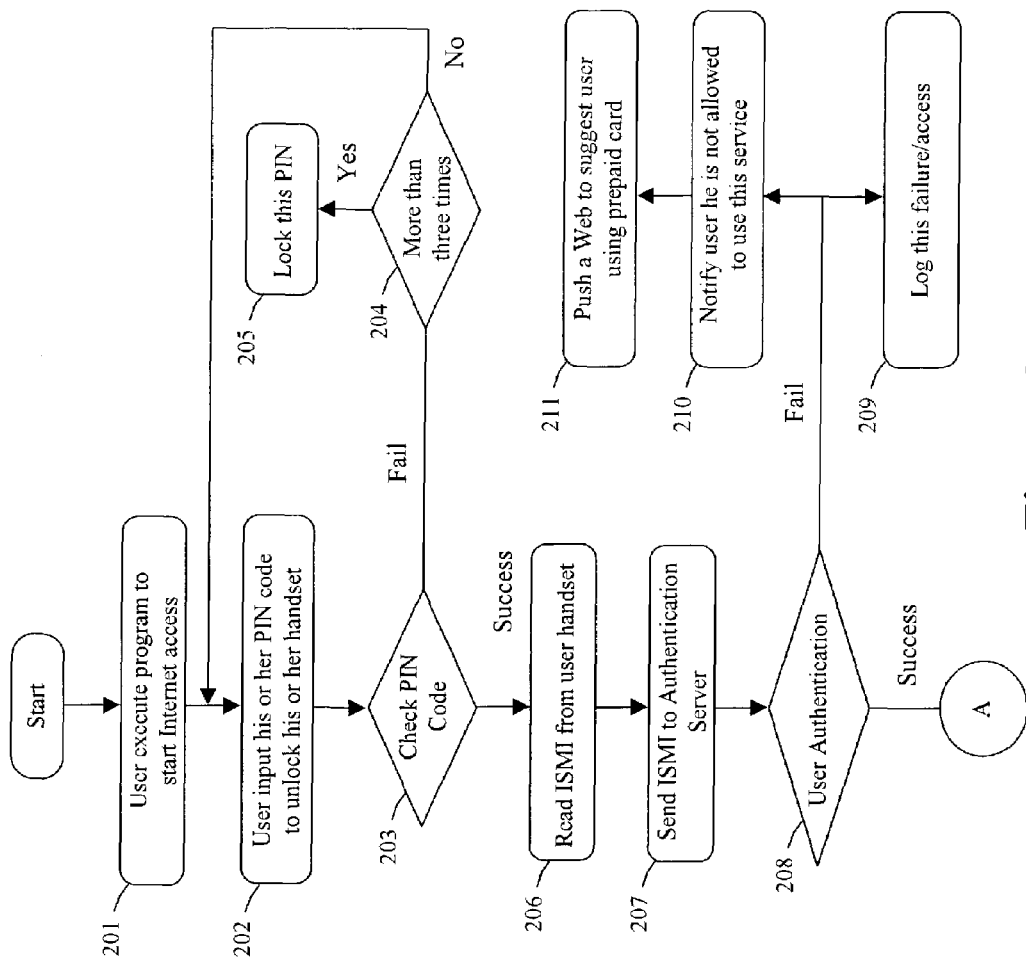
FIGS. 2 and 3 are flow diagrams illustrating an authentication, authorization and accounting (AAA) method for a plurality of wireless local area networks operated by a plurality of WLAN operators according to another embodiment of the invention.
Figure 3:
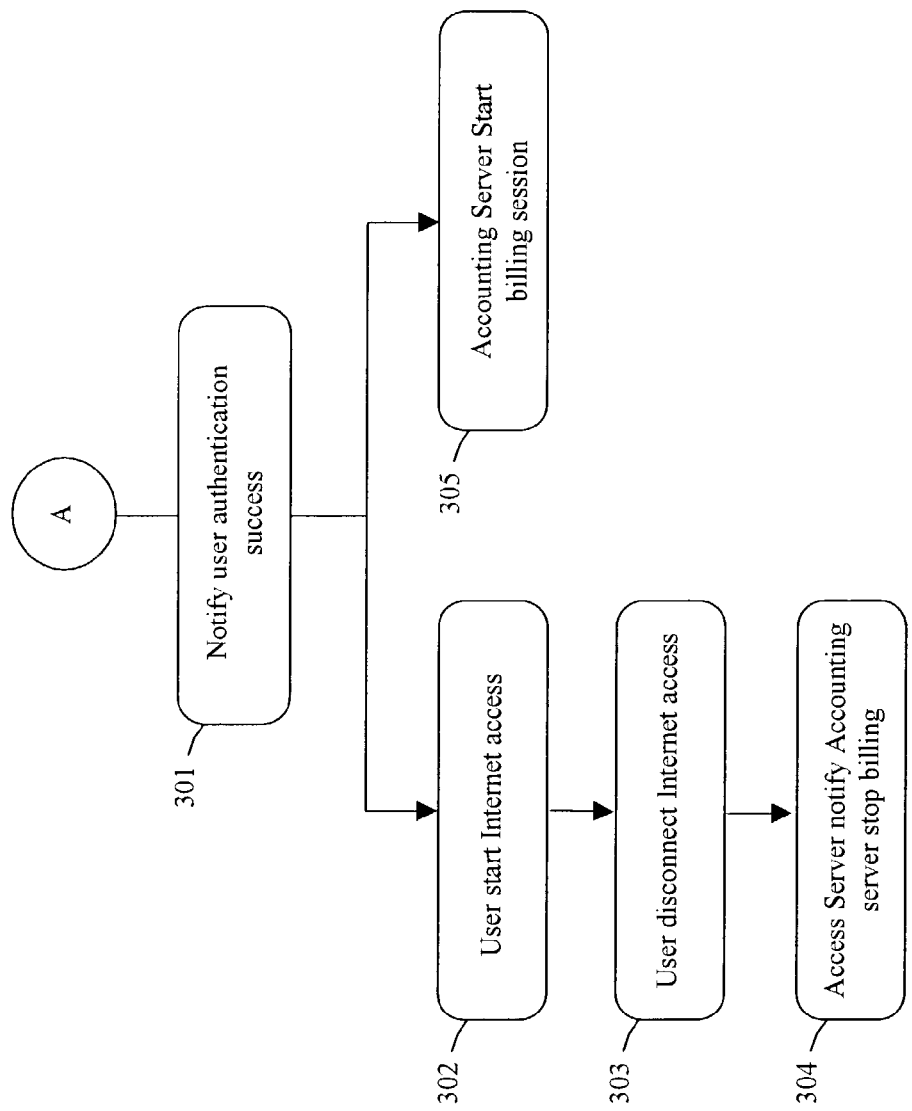

FIGS. 2 and 3 are flow diagrams that illustrate an authentication, authorization and accounting (AAA) method for a plurality of wireless local area networks operated by a plurality of WLAN operators according to another embodiment of the invention. According to this particular embodiment of the method of the invention, a mobile communications device 101 is connected to a terminal 102 having an Internet access application program for accessing the Internet, a personal identification number (PIN) application program, and a subscriber identity module (SIM) application program. A subscriber identity module (SIM) can be digitally stored in the mobile device 101, e.g., in a form of a miniature integrated circuits (IC) card, for identifying the end user and the device's subscriber status with the WLAN operators.

An Internet access session is requested from the mobile device 101 by activating the Internet access application program in the terminal (step 201). Entry of a PIN is requested by activating the PIN application program in the terminal (step 202). The PIN then undergoes authentication in step 203. If the PIN is not authenticated, the control flow is directed to step 204 where it is determined if the PIN authentication failed more than three times. If it is determined in step 204 that the PIN authentication failed more than three times, the control flow is directed to step 205 where the PIN is locked and put out of service for a predetermined period of time or on a more permanent basis. If the PIN authentication failed less than three times, the control flow is returned from step 204 to step 201 where steps 201, 202 and 203 are repeated.

If the PIN entered is authenticated in step 203, an international mobile subscriber identity (IMSI) number is retrieved from the mobile device 101 (step 206) by activating the SIM application program in the terminal wherein the IMSI number is accepted by all of the plurality of WLANs operated by the WLAN operators. The IMSI number is a combination of mobile country code (MCC) that identifies the country of WLAN operation, mobile network code (MNC) that identifies the specific WLAN (e.g., the MNC of one of the plurality of WLAN operators), and mobile station identification number (MSIN) that identifies the mobile or wireless device (e.g., the MSIN of the mobile device 101).

In step 207, the IMSI number is sent to an authentication server 121 for WLAN authentication. In step 208, the IMSI number then undergoes authentication at the authentication server 121. If the IMSI number is not authenticated at the authenticated server 121 in step 208, the authentication failure is logged and recorded (step 209). Furthermore, through the mobile device 101, the end user is notified that he or she is not allowed access (step 210) and a Web message urging the use of a prepaid card is displayed (step 211).

If the IMSI number is authenticated at the authentication server 121 in step 208, the control flow is directed to step A and then step 301 where an access server 104 is instructed that the IMSI number is authenticated and the end user, through the mobile device 101, is notified of the authentication success. In step 302, an Internet access session is then provided to the mobile device 101. From the access server 104, an accounting server 122 is instructed to begin access fee calculation. The access fee calculation is then performed at the accounting server 122 in step 305. In step 303, if it is determined that the Internet access session has ended at the access server 104 (e.g., through voluntary or involuntary disconnect by the end user), the access fee calculation is ended at the accounting server 122 (step 304) and a total fee from the access fee calculation is determined.

A further variation of this particular embodiment of the method according to the invention can further include the steps of denying Internet access by the mobile device 101, displaying the denied access and the option of pre-paid access at the mobile device 101, if the PIN is not authenticated in step 203. In addition, a credit card charge can be requested for the pre-paid access option at the mobile device 101 where a new PIN is provided after the credit card is charged. Another PIN entry is requested at the mobile device 101 where the PIN entered is sent to the authentication server 121 for authentication. If the new PIN is authenticated, the process steps of the method according to this particular embodiment of the invention are repeated.

Figure 4:
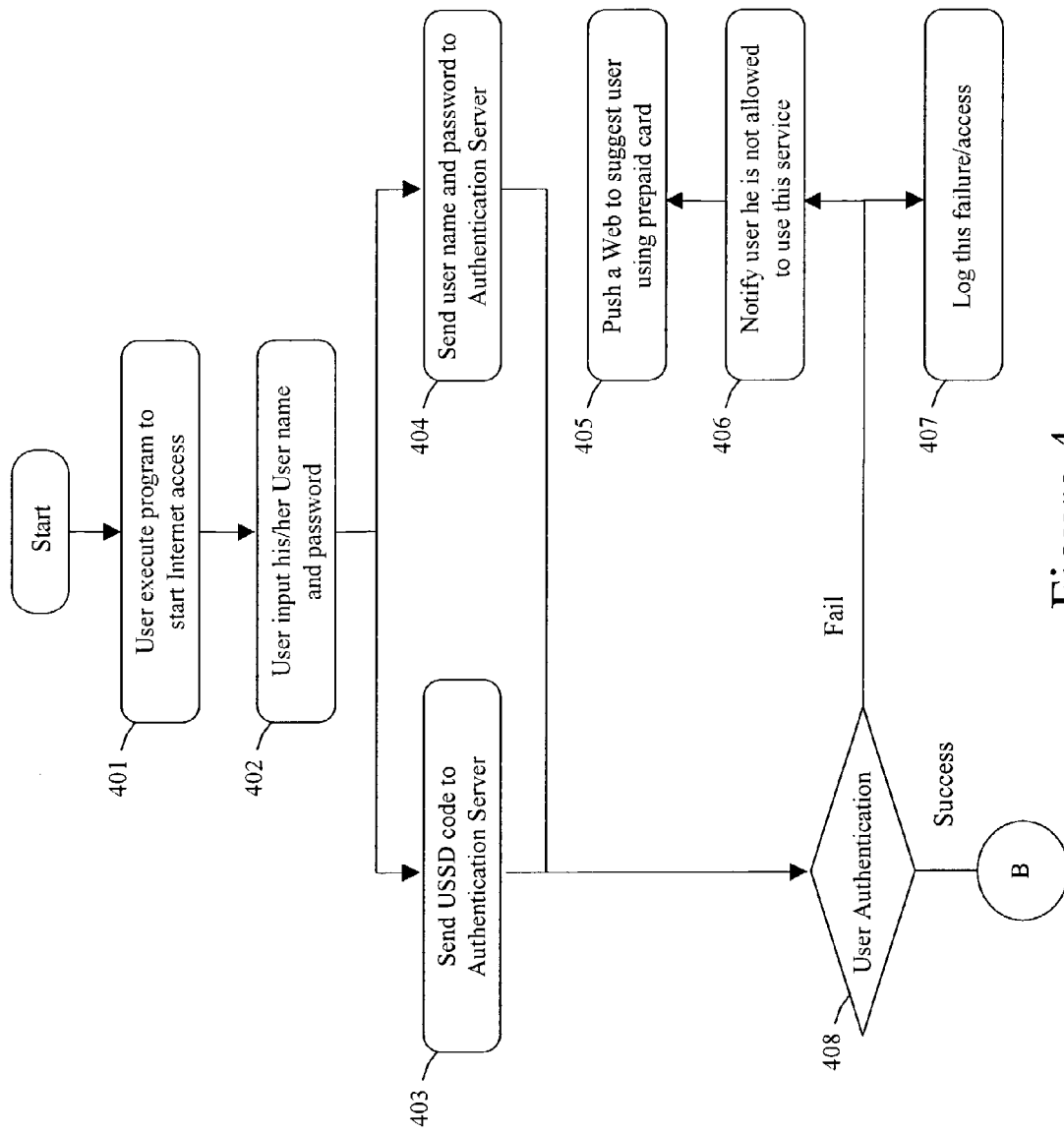
FIGS. 4 and 5 are flow diagrams illustrating an authentication, authorization and accounting (AAA) method for a plurality of wireless local area networks operated by a plurality of WLAN operators according to a further embodiment of the invention.
Figure 5:
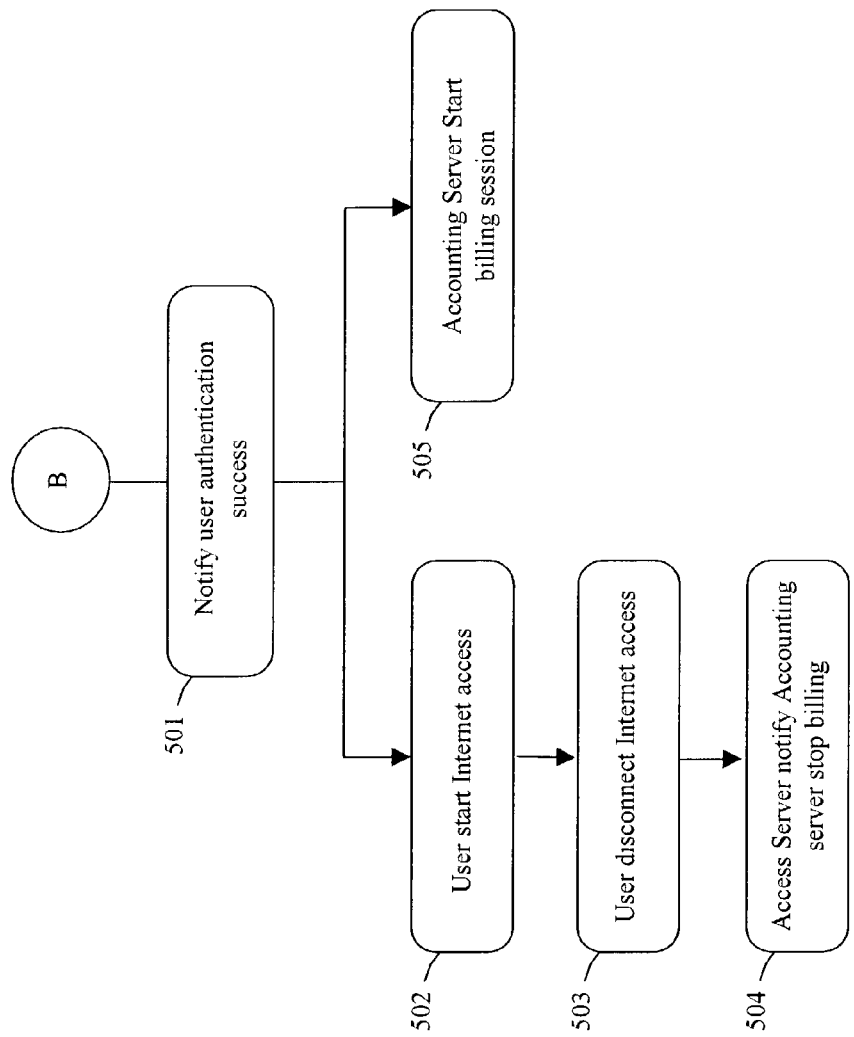

FIGS. 4 and 5 are flow diagrams that illustrate an authentication, authorization and accounting (AAA) method for a plurality of wireless local area networks operated by a plurality of WLAN operators according to a further embodiment of the invention. According to this particular embodiment of the method of the invention, a mobile communications device 101 is connected to a terminal 102 having an Internet access application program for accessing the Internet, and an unstructured supplementary service data (USSD) application program. An Internet access session is requested from the mobile device 101 by activating the Internet access application program in the terminal (step 401). Entry of a user name and password is requested by activating the USSD application program in the terminal (step 402). USSD is a platform for interactive messaging services within Global System for Mobile Communications (GSM) networks.

An unstructured supplementary service data (USSD) code of the mobile device 101, along with the user name and password, then undergoes authentication at the authentication server 121 (steps 403 and 404, respectively). If the USSD code, user name or password is not authenticated at the authenticated server 121 in step 408, the authentication failure is logged and recorded (step 407). Furthermore, through the mobile device 101, the end user is notified that he or she is not allowed access (step 406) and a Web message urging the use of a prepaid card is displayed (step 405).

If the USSD code, user name and password are authenticated at the authentication server 121 in step 408, the control flow is directed to step B and then step 501 where an access server 104 is instructed and the end user, through the mobile device 101, is notified of the authentication success. In step 502, an Internet access session is then provided to the mobile device 101. From the access server 104, an accounting server 122 is instructed to begin access fee calculation. The access fee calculation is then performed at the accounting server 122 in step 505. In step 503, if it is determined that the Internet access session has ended at the access server 104 (e.g., through voluntary or involuntary disconnect by the end user), the access fee calculation is ended at the accounting server 122 (step 504) and a total fee from the access fee calculation is determined.

A further variation of this particular embodiment of the method according to the invention can further include the steps of denying Internet access by the mobile device 101, displaying the denied access and the option of pre-paid access at the mobile device 101, if the PIN is not authenticated in step 408. In addition, a credit card charge can be requested for the pre-paid access option at the mobile device 101 where a new user password is provided after the credit card is charged. Another user password entry is requested at the mobile device 101 where the password entered is sent to the authentication server 121 for authentication. If the new password is authenticated, the process steps of the method according to this particular embodiment of the invention are repeated.

Figure 6:
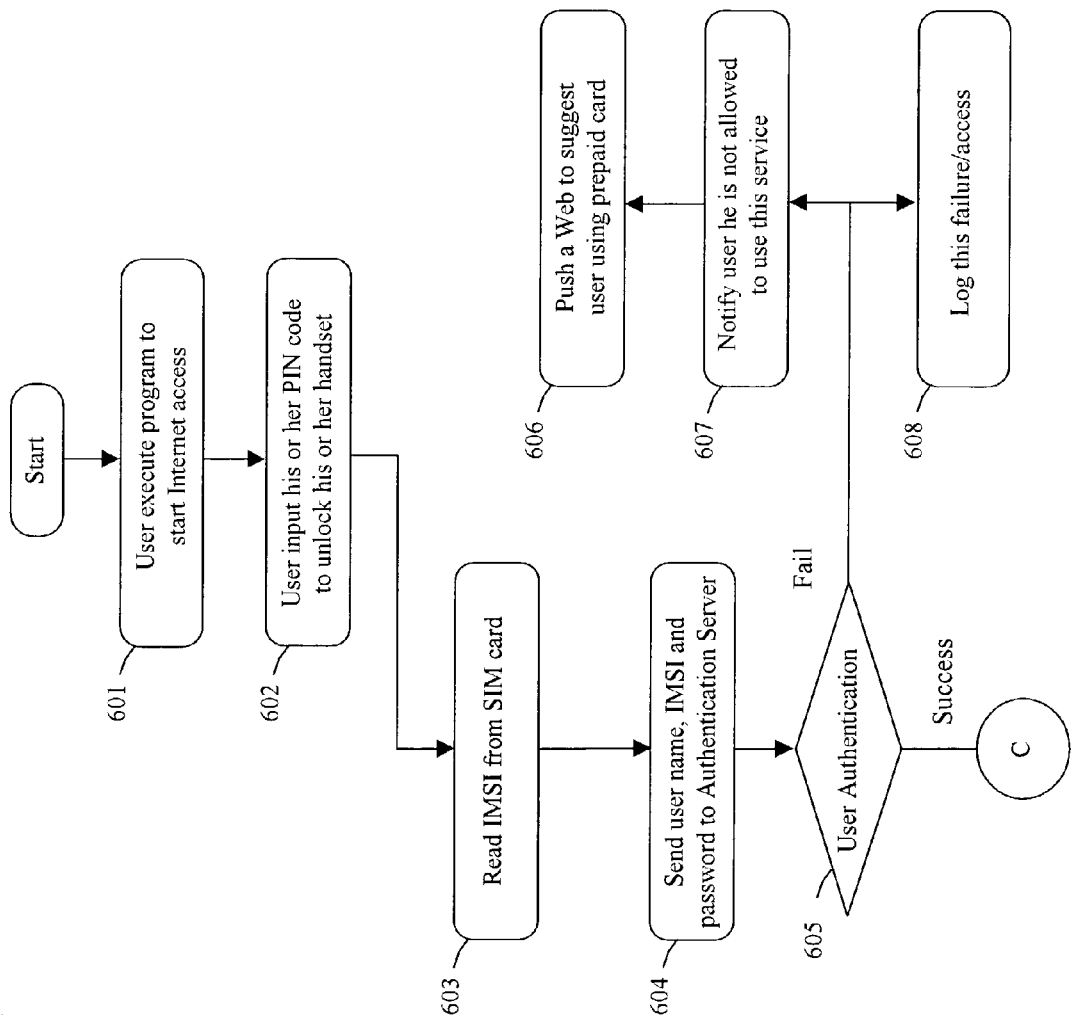
FIGS. 6 and 7 are flow diagrams illustrating an authentication, authorization and accounting (AAA) method for a plurality of wireless local area networks operated by a plurality of WLAN operators according to yet another embodiment of the invention.
Figure 7:
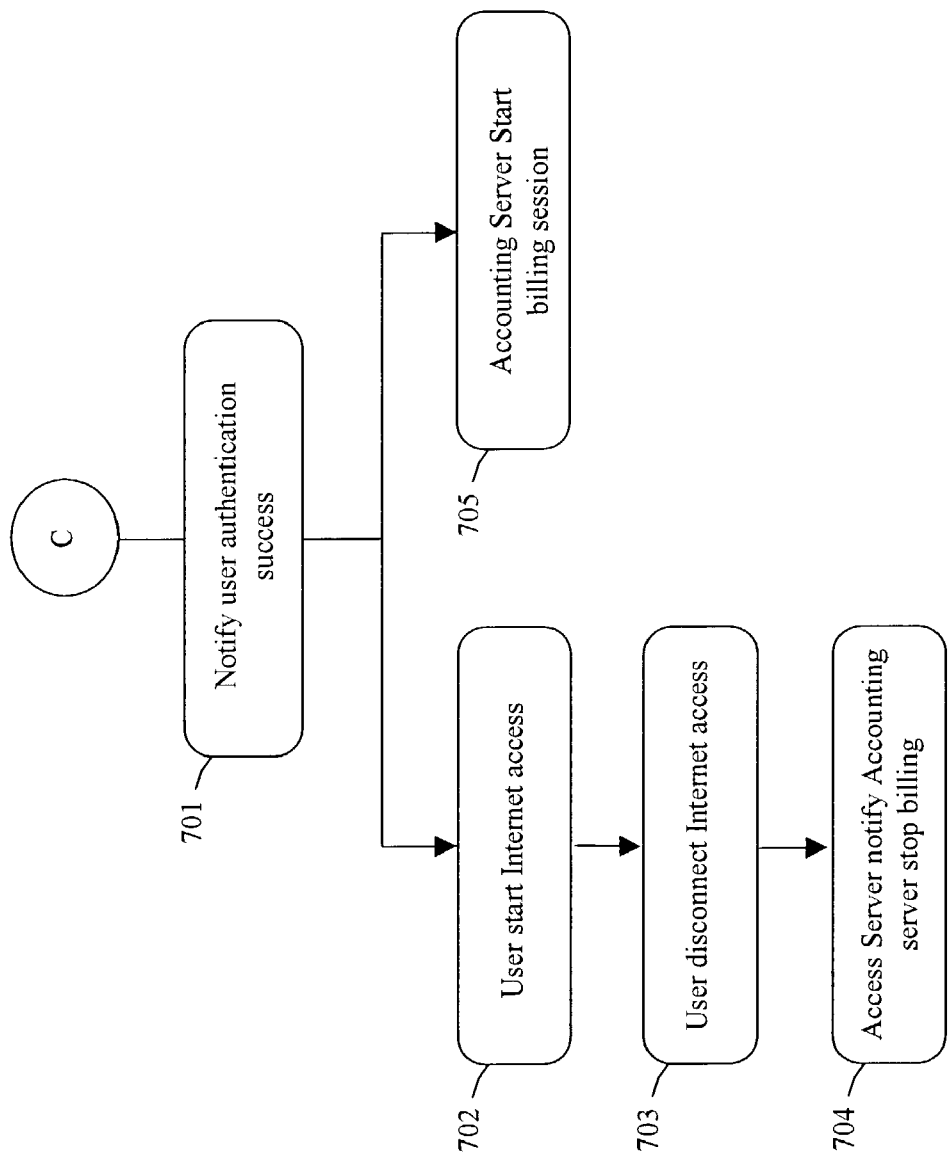

FIGS. 6 and 7 are flow diagrams that illustrate an authentication, authorization and accounting (AAA) method for a plurality of wireless local area networks operated by a plurality of WLAN operators according to another embodiment of the invention. According to this particular embodiment of the method of the invention, a mobile communications device 101 is connected to a terminal 102 having an Internet access application program for accessing the Internet, a personal identification number (PIN) application program, and a subscriber identity module (SIM) application program. An Internet access session is requested from the mobile device 101 by activating the Internet access application program in the terminal (step 601). Entry of a PIN is requested by activating the PIN application program in the terminal (step 602). The PIN then undergoes authentication. If the PIN entered is authenticated, an international mobile subscriber identity (IMSI) number is retrieved from the mobile device 101 (step 603) by activating the SIM application program in the terminal wherein the IMSI number is accepted by all of the plurality of WLANs operated by the WLAN operators. In step 604, the IMSI number, along with the name and password for the end user, is sent to an authentication server 121 for WLAN authentication. In step 605, the IMSI number then undergoes authentication at the authentication server 121. If the IMSI number is not authenticated at the authenticated server 121 in step 605, the authentication failure is logged and recorded (step 608). Furthermore, through the mobile device 101, the end user is notified that he or she is not allowed access (step 607) and a Web message urging the use of a prepaid card is displayed (step 606).

If the IMSI number is authenticated at the authentication server 121 in step 605, the control flow is directed to step C and then step 701 where an access server 104 is instructed that the IMSI number is authenticated and the end user, through the mobile device 101, is notified of the authentication success. In step 702, an Internet access session is then provided to the mobile device 101. From the access server 104, an accounting server 122 is instructed to begin access fee calculation. The access fee calculation is then performed at the accounting server 122 in step 705. In step 703, if it is determined that the Internet access session has ended at the access server 104 (e.g., through voluntary or involuntary disconnect by the end user), the access fee calculation is ended at the accounting server 122 (step 704) and a total fee from the access fee calculation is determined.

A further variation of this particular embodiment of the method according to the invention can further include the steps of denying Internet access by the mobile device 101, displaying the denied access and the option of pre-paid access at the mobile device 101, if the PIN is not authenticated in step 605. In addition, a credit card charge can be requested for the pre-paid access option at the mobile device 101 where a new PIN is provided after the credit card is charged. Another PIN entry is requested at the mobile device 101 where the PIN entered is sent to the authentication server 121 for authentication. If the new PIN is authenticated, the process steps of the method according to this particular embodiment of the invention are repeated.

The process steps according to the authentication, authorization and accounting (AAA) method and system of the invention are advantageously transparent to the WLAN operators and implemented regardless of the types of WLAN operations. This cross-platform AAA functionality is particularly advantageous for WLAN environments where multiple WLAN formats and operators coexist. The method and system according to the invention can advantageously be implemented across heterogeneous WLANs where the switching of interfaces is no longer necessary when connecting to different networks.

While the above is a full description of the specific embodiments, various modifications, alternative constructions and equivalents may be used. For example, although Wireless Application Protocol (WAP) is utilized in the examples, any kind of wireless communication system and non-wireless or hard-wired system are within the contemplation of the present invention, and the various trademarked names could just as easily be substituted for with, for example, "VerbalNET" to emphasize that any network communication system is within the scope of the implementations of this invention. Therefore, the above description and illustrations should not be taken as limiting the scope of the present invention which is defined by the following claims.

We claim:

1. An authentication, authorization and accounting (AAA) method for a plurality of wireless local area networks (WLANs) operated by a plurality of WLAN operators comprising the steps of:

(a) connecting a mobile communications device to a terminal having an Internet access application program for accessing the Internet, a personal identification number (PIN) application program, and a subscriber identity module (SIM) application program;

(b) requesting an Internet access session from said mobile device by activating said Internet access application program in said terminal;
(c) requesting entry of a PIN by activating said PIN application program in said terminal;
(d) authenticating said PIN;
(e) if said PIN is authenticated in step (d),
    (f) retrieving an international mobile subscriber identity (IMSI) number from said mobile device by activating said SIM application program in said terminal wherein said IMSI number is accepted by all of said plurality of WLANs operated by said WLAN operators;
    (g) sending said IMSI number to an authentication server for WLAN authentication;
    (h) authenticating said IMSI number at said authentication server;
    (i) if said IMSI number is authenticated in step (h),
        (j) instructing an access server that said IMSI number is authenticated;
        (k) providing said Internet access session to said mobile device;
        (l) instructing an accounting server from said access server to begin access fee calculation;
        (m) performing said access fee calculation at said accounting server;
        (n) determining if said Internet access session has ended at said access server;
        (o) if it is determined in step (n) that said Internet access session has ended,
            (p) ending said access fee calculation at said accounting server;
            (q) calculating a total fee from said access fee calculation ended in step (p).

2. The method of claim 1 further comprising the step of displaying said total fee at said mobile device.

3. The method of claim 1 further comprising the step of: if said PIN is not authenticated in step (d), repeating steps (c) and (d).

4. The method of claim 3 further comprising the step of: if step (c) is repeated more than three times, denying Internet access by said mobile device.

5. The method of claim 1 further comprising the step of: if said PIN is not authenticated in step (d), denying Internet access by said mobile device.

6. The method of claim 1 further comprising the steps of: if said PIN is not authenticated in step (d),
    (r) denying Internet access by said mobile device;
    (s) displaying denied access at said mobile device; and
    (t) logging said denied access at said authentication server.

7. The method of claim 1 further comprising the steps of: if said PIN is not authenticated in step (d),
    (u) denying Internet access by said mobile device;
    (v) displaying denied access at said mobile device; and
    (w) displaying option of pre-paid access at said mobile device.

8. The method of claim 7 further comprising the steps of:
(x) requesting a credit card charge for said pre-paid access at said mobile device;
(y) performing said credit card charge;
(z) providing a new PIN for Internet access;
(aa) requesting entry of said new PIN at said mobile device; and
(bb) authenticating said new PIN.

9. The method of claim 8 further comprising the step of: if said new PIN is authenticated in step (bb), repeating steps (f), (g), (h), (i), (j), (k), (l), (m), (n), (o), (p) and (q).

10. The method of claim 1 wherein step (e) further comprises the steps of:
(cc) sending an unstructured supplementary service data (USSD) code from said terminal to said authentication server by activating a USSD application program at said terminal wherein said USSD code is accepted by all of said plurality of WLANs operated by said WLAN operators; and
(dd) retrieving said IMSI number for said mobile device from said USSD code.

11. The method of claim 1 further comprising the step of: if said IMSI number is not authenticated in step (h), denying Internet access by said mobile device.

12. The method of claim 1 further comprising the steps of: if said IMSI number is not authenticated in step (h),
    (ee) denying Internet access by said mobile device;
    (ff) displaying denied access at said mobile device; and
    (gg) logging said denied access at said authentication server.

13. The method of claim 1 further comprising the steps of: if said IMSI number is not authenticated in step (h),
    (hh) denying Internet access by said mobile device;
    (ii) displaying denied access at said mobile device; and
    (jj) displaying option of pre-paid access at said mobile device.

14. The method of claim 13 further comprising the steps of:
(kk) requesting a credit card charge for said pre-paid access at said mobile device;
(ll) performing said credit card charge;
(mm) authenticating said IMSI number;
(nn) repeating steps (f), (g), (h), (i), (j), (k), (l), (m), (n), (o), (p) and (q).

15. The method of claim 1 wherein said mobile device is one selected from the group consisting of a mobile telephone, mobile handset, palmtop computer and personal digital assistant (PDA);
wherein said terminal is one selected from the group consisting of a personal computer (PC), notebook computer, palmtop computer and personal digital assistant (PDA).

16. An authentication, authorization and accounting (AAA) method for a plurality of wireless local area networks (WLANs) operated by a plurality of WLAN operators comprising the steps of:
(1) connecting a mobile communications device to a terminal having an Internet access application program for accessing the Internet, a personal identification number (PIN) application program, and a unique identifier application program;
(2) requesting an Internet access session from said mobile device by activating said Internet access application program in said terminal;
(3) requesting entry of a PIN by activating said PIN application program in said terminal;
(4) authenticating said PIN;
(5) if said PIN is authenticated in step (4),
    (6) retrieving a unique identifier from said mobile device by activating said unique identifier application program in said terminal wherein said unique identifier is accepted by all of said plurality of WLANs operated by said WLAN operators;

(7) sending said unique identifier to an authentication server for WLAN authentication;
(8) authenticating said unique identifier at said authentication server;
(9) if said unique identifier is authenticated in step (8),
   (10) instructing an access server that said unique identifier is authenticated;
   (11) instructing an accounting server from said access server to begin access fee calculation;
   (12) performing said access fee calculation at said accounting server;
   (13) determining if said Internet access session has ended at said access server;
   (14) if it is determined in step (13) that said Internet access session has ended,
     (15) ending said access fee calculation at said accounting server; and
     (16) calculating a total fee from said access fee calculation ended in step (15).

17. The method of claim 16 wherein said unique identifier is an international mobile subscriber identity (IMSI) number and said unique identifier application program is a subscriber identity module (SIM) application program.

18. The method of claim 17 wherein step (5) further comprises the steps of:
   (17) sending an unstructured supplementary service data (USSD) code from said terminal to said authentication server by activating a USSD application program at said terminal wherein said USSD code is accepted by all of said plurality of WLANs operated by said WLAN operators; and
   (18) retrieving said IMSI number for said mobile device from said USSD code.

19. The method of claim 16 further comprising the step of displaying said total fee at said mobile device.

20. The method of claim 16 further comprising the step of:
if said PIN is not authenticated in step (4), repeating steps (3) and (4).

21. The method of claim 20 further comprising the step of:
if step (3) is repeated more than three times, denying Internet access by said mobile device.

22. The method of claim 16 further comprising the step of:
if said PIN is not authenticated in step (4), denying Internet access by said mobile device.

23. The method of claim 16 further comprising the steps of:
if said PIN is not authenticated in step (4),
   (19) denying Internet access by said mobile device;
   (20) displaying denied access at said mobile device; and
   (21) logging said denied access at said authentication server.

24. The method of claim 16 further comprising the steps of:
if said PIN is not authenticated in step (4),
   (22) denying Internet access by said mobile device;
   (23) displaying denied access at said mobile device; and
   (24) displaying option of pre-paid access at said mobile device.

25. The method of claim 24 further comprising the steps of:
   (25) requesting a credit card charge for said pre-paid access at said mobile device;
   (26) performing said credit card charge;
   (27) providing a new PIN for Internet access;
   (28) requesting entry of said new PIN at said mobile device; and
   (29) authenticating said new PIN.

26. The method of claim 25 further comprising the step of:
if said new PIN is authenticated in step (29), repeating steps (6), (7), (8), (9), (10), (11), (12), (13), (14), (15) and (16).

27. The method of claim 16 further comprising the step of:
if said unique identifier is not authenticated in step (8), denying Internet access by said mobile device.

28. The method of claim 16 further comprising the steps of:
if said unique identifier is not authenticated in step (8),
   (30) denying Internet access by said mobile device;
   (31) displaying denied access at said mobile device; and
   (32) logging said denied access at said authentication server.

29. The method of claim 16 further comprising the steps of:
if said unique identifier is not authenticated in step (8),
   (33) denying Internet access by said mobile device;
   (34) displaying denied access at said mobile device; and
   (35) displaying option of pre-paid access at said mobile device.

30. The method of claim 29 further comprising the steps of:
   (36) requesting a credit card charge for said pre-paid access at said mobile device;
   (37) performing said credit card charge;
   (38) authenticating said unique identifier;
   (39) repeating steps (6), (7), (8), (9), (10), (11), (12), (13), (14), (15) and (16).

31. The method of claim 16 wherein said mobile device is one selected from the group consisting of a mobile telephone, mobile handset, palmtop computer and personal digital assistant (PDA).

32. The method of claim 16 wherein said terminal is one selected from the group consisting of a personal computer (PC), notebook computer, palmtop computer and personal digital assistant (PDA).

33. The method of claim 16 wherein said steps (1) through (16) are transparent to said WLAN operators.

34. An authentication, authorization and accounting (AAA) system for a plurality of wireless local area networks (WLANs) operated by a plurality of WLAN operators comprising:
a mobile communications device connecting to a terminal comprising an Internet access application program for accessing the Internet, a personal identification number (PIN) application program, and a unique identifier application program;
wherein an Internet access session is requested from said mobile device by activating said Internet access application program in said terminal;
wherein entry of a PIN is requested by activating said PIN application program in said terminal;
wherein said PIN is authenticated;
if said PIN is authenticated, a unique identifier is retrieved from said mobile device by activating said unique identifier application program in said terminal wherein said unique identifier is accepted by all of said plurality of WLANs operated by said WLAN operators;
wherein said unique identifier is sent to an authentication server for WLAN authentication;

if said authentication server authenticates said unique identifier, said authentication server instructs an access server that said unique identifier has been authenticated wherein said access server instructs an accounting server to begin access fee calculation;

if said access server determines that said Internet access session has ended, said access fee calculation is ended at said accounting server and a total fee is calculated from said ended access fee calculation.

35. The system of claim 34 wherein said unique identifier is an international mobile subscriber identity (IMSI) number and said unique identifier application program is a subscriber identity module (SIM) application program.

36. The system of claim 35 wherein said terminal further comprises an unstructured supplementary service data (USSD) application program;

wherein said terminal sends an unstructured supplementary service data (USSD) code to said authentication server by activating said USSD application program;

wherein said IMSI number for said mobile device is retrieved from said USSD code; and wherein said USSD code is accepted by all of said plurality of WLANs operated by said WLAN operators.

37. The system of claim 34 wherein said total fee is displayed at said mobile device.

38. The system of claim 34 wherein said PIN authentication is repeated.

39. The system of claim 38 wherein Internet access by said mobile device is denied if said PIN authentication is repeated more than three times.

40. The system of claim 34 wherein Internet access by said mobile device is denied if said PIN is not authenticated.

41. The system of claim 34 wherein, if said PIN is not authenticated, Internet access by said mobile device is denied, said mobile device displays said denied access, and said authentication server logs said denied access.

42. The system of claim 34 wherein, if said PIN is not authenticated, Internet access by said mobile device is denied, and said mobile device displays said denied access and option of pre-paid access.

43. The system of claim 42 wherein said mobile device requests a credit card charge is requested for said pre-paid access;

wherein said credit card charge is performed and a new PIN for Internet access is provided;

wherein said mobile device requests entry of said new PIN and said new PIN is authenticated.

44. The system of claim 34 wherein Internet access is denied by said mobile device if said unique identifier is not authenticated.

45. The system of claim 34 wherein, if said unique identifier is not authenticated, Internet access by said mobile device is denied, said mobile device displays said denied access, and said authentication server logs said denied access.

46. The system of claim 34 wherein, if said unique identifier is not authenticated, Internet access by said mobile device is denied, and said mobile device displays said denied access and option of pre-paid access.

47. The system of claim 46 wherein said mobile device requests a credit card charge for said pre-paid access;

wherein said credit card charge is performed and said unique identifier is authenticated.

48. The system of claim 34 wherein said mobile device is one selected from the group consisting of a mobile telephone, mobile handset, palmtop computer and personal digital assistant (PDA).

49. The system of claim 34 wherein said terminal is one selected from the group consisting of a personal computer (PC), notebook computer, palmtop computer and personal digital assistant (PDA).

50. The system of claim 34 further comprising an access point communicable with said terminal and said access server wherein said access point is provided between said terminal and said access server.

51. An authentication, authorization and accounting (AAA) method for a plurality of wireless local area networks (WLANs) operated by a plurality of WLAN operators comprising the steps of:

(i) connecting a mobile communications device having an unstructured supplementary service data (USSD) code to a terminal having an Internet access application program for accessing the Internet and an unstructured supplementary service data (USSD) application program, wherein said USSD code is accepted by all of said plurality of WLANs operated by said WLAN operators;

(ii) requesting an Internet access session from said mobile device by activating said Internet access application program in said terminal;

(iii) requesting entry of a user name and password;

(iv) authenticating said USSD code, user name and password;

(v) sending said USSD code, user name and password to an authentication server for WLAN authentication;

(vi) authenticating said USSD code, user name and password at said authentication server;

(vii) if said USSD code, user name and password are authenticated in step (vi), (viii) instructing an accounting server from said access server to begin access fee calculation;

(ix) performing said access fee calculation at said accounting server;

(x) determining if said Internet access session has ended at said access server;

(xi) if it is determined in step (x) that said Internet access session has ended, (xii) ending said access fee calculation at said accounting server; and (xiii) calculating a total fee from said access fee calculation ended in step (xii).

52. The method of claim 51 further comprising the step of displaying said total fee at said mobile device.

53. The method of claim 51 further comprising the step of:

if said USSD code is not authenticated in step (xi), denying Internet access by said mobile device.

54. The method of claim 51 further comprising the steps of:

if said USSD code are not authenticated in step (xi), (xiv) denying Internet access by said mobile device;

(xv) displaying denied access at said mobile device; and (xvi) logging said denied access at said authentication server.

55. The method of claim 51 further comprising the steps of:

if said user name and password are not authenticated in step (xi), (xvii) denying Internet access by said mobile device;

(xviii) displaying denied access at said mobile device; and (xix) logging said denied access at said authentication server.

56. The method of claim 55 further comprising the steps of:
(xx) requesting a credit card charge for said pre-paid access at said mobile device;
(xxi) performing said credit card charge;
(xxii) authenticating said user name and password; and
(xxiii) repeating steps (viii), (ix), (x), (xi), (xii) and (xiii).

57. The method of claim 51 wherein said mobile device is one selected from the group consisting of a mobile telephone, mobile handset, palmtop computer and personal digital assistant (PDA).

58. The method of claim 51 wherein said terminal is one selected from the group consisting of a personal computer (PC), notebook computer, palmtop computer and personal digital assistant (PDA).

59. The method of claim 51 wherein said steps (i) through (xiii) are transparent to said WLAN operators.

60. The method of claim 51 further comprising the step of providing an access point between said terminal and said access server wherein said access point is communicable with said terminal and said access server.

* * * * *

UNITED STATES PATENT AND TRADEMARK OFFICE
CERTIFICATE OF CORRECTION

PATENT NO. : 7,242,676 B2  Page 1 of 1
APPLICATION NO. : 10/274938
DATED : July 10, 2007
INVENTOR(S) : Herman Rao et al.

It is certified that error appears in the above-identified patent and that said Letters Patent is hereby corrected as shown below:

On the Title page, Item (73), Assignee, should be --Far EasTone Telecommunications Co., Ltd., Taipei (TW)--

Signed and Sealed this

Eleventh Day of March, 2008

JON W. DUDAS
*Director of the United States Patent and Trademark Office*